United States Patent [19]

Grassini

[11] Patent Number: 5,060,340
[45] Date of Patent: Oct. 29, 1991

[54] WINDSCREEN WIPER WITH TRANSLATIONAL MOTION, PARTICULARLY FOR A SPOILER ABOVE THE REAR WINDOW OF A MOTOR CAR

[75] Inventor: Osvaldo Grassini, Torino, Italy
[73] Assignee: Fiat Auto S.p.A., Torino, Italy
[21] Appl. No.: 392,193
[22] Filed: Aug. 9, 1989

[30] Foreign Application Priority Data

Oct. 7, 1988 [IT] Italy .............................. 67901 A/88

[51] Int. Cl.$^5$ ........................ B60S 1/20; B62D 37/02
[52] U.S. Cl. ............................. 15/250.24; 15/250.29; 296/180.1
[58] Field of Search ............ 15/250 R, 250 A, 250 B, 15/250.24, 250.25, 250.26, 250.27, 250.28, 250.29; 296/180.1

[56] References Cited

U.S. PATENT DOCUMENTS

| Re. 15,331 | 4/1922 | Demand | 15/250.24 |
| 934,007 | 9/1909 | Null | 15/250.24 |
| 1,685,037 | 9/1928 | Van Derbeck | 15/250.29 |
| 1,715,991 | 6/1929 | Chandler | 15/250.26 |
| 1,723,189 | 8/1929 | Morten | 15/250.26 |
| 1,864,618 | 6/1932 | Reynolds | 15/250.24 X |
| 1,899,276 | 2/1933 | Knapp | 15/250.29 X |
| 1,903,439 | 4/1933 | Cain | 15/250.24 |
| 2,253,029 | 8/1941 | Hart | 15/250.29 |
| 2,648,087 | 8/1953 | Kakeer, Jr. et al. | 15/250.24 |
| 2,785,429 | 3/1957 | Walters | 15/250.26 |
| 2,786,225 | 3/1957 | Stites | 15/250.29 |
| 3,428,996 | 2/1969 | Carpenter | 15/250.29 |
| 4,162,555 | 7/1979 | Jackson | 15/250.24 |
| 4,603,898 | 8/1986 | Udagawa et al. | 15/250 R |
| 4,756,568 | 7/1988 | Yamamoto et al. | 15/250.16 X |

FOREIGN PATENT DOCUMENTS

| 301453 | 2/1989 | European Pat. Off. | |
| 302343 | 2/1989 | European Pat. Off. | |
| 662718 | 6/1938 | Fed. Rep. of Germany | 15/250.24 |
| 880556 | 6/1953 | Fed. Rep. of Germany | 15/250.29 |
| 3013976 | 10/1981 | Fed. Rep. of Germany | 15/250 B |
| 3226578 | 1/1984 | Fed. Rep. of Germany | |
| 698545 | 1/1931 | France | |
| 1577895 | 8/1969 | France | 15/250 A |
| 2360446 | 4/1978 | France | 15/250 B |
| 2402553 | 4/1979 | France | |

Primary Examiner—Robert W. Jenkins
Assistant Examiner—C. Cooley
Attorney, Agent, or Firm—Spensley Horn Jubas & Lubitz

[57] ABSTRACT

A windscreen wiper assembly with translational motion is adapted to wipe the rear window of a motor car. All the parts of the windscreen wiper, including its driving motor and mechanical parts for imparting a reciprocal translational motion to the wiper blade, can be mounted internally within a spoiler. The spoiler is externally mounted to the car in parallel with and above the upper horizontal edge of the rear window.

6 Claims, 2 Drawing Sheets

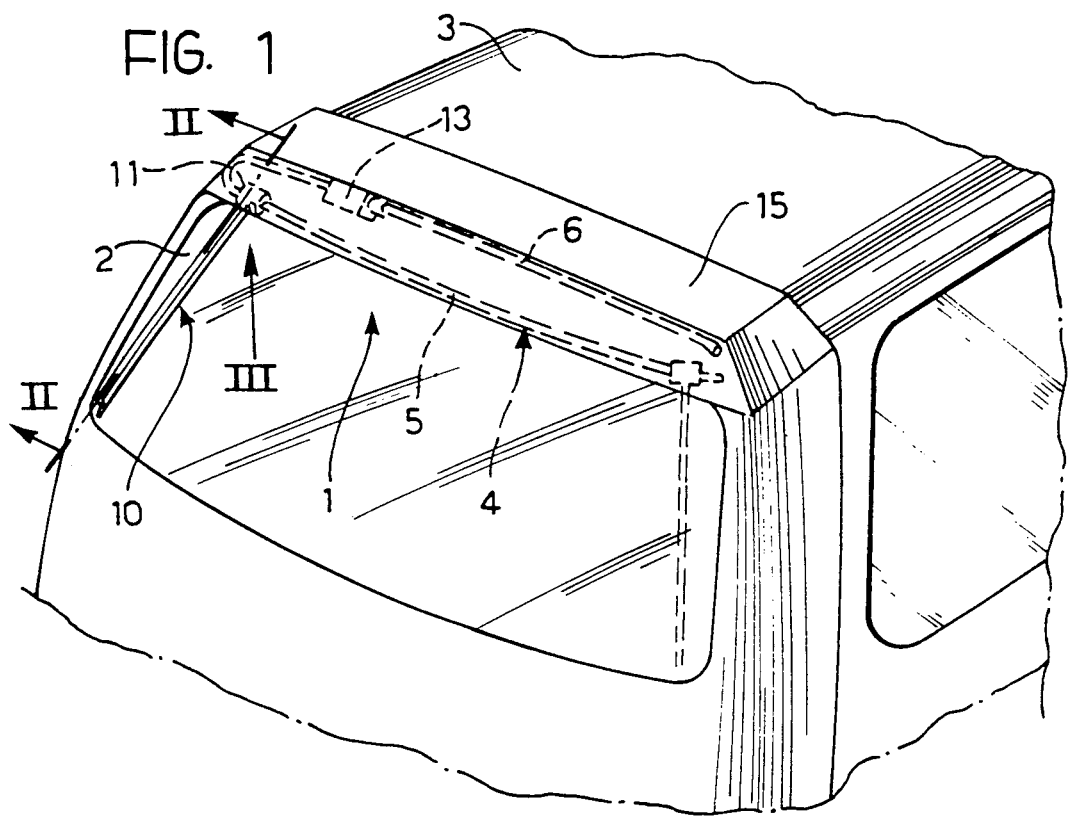
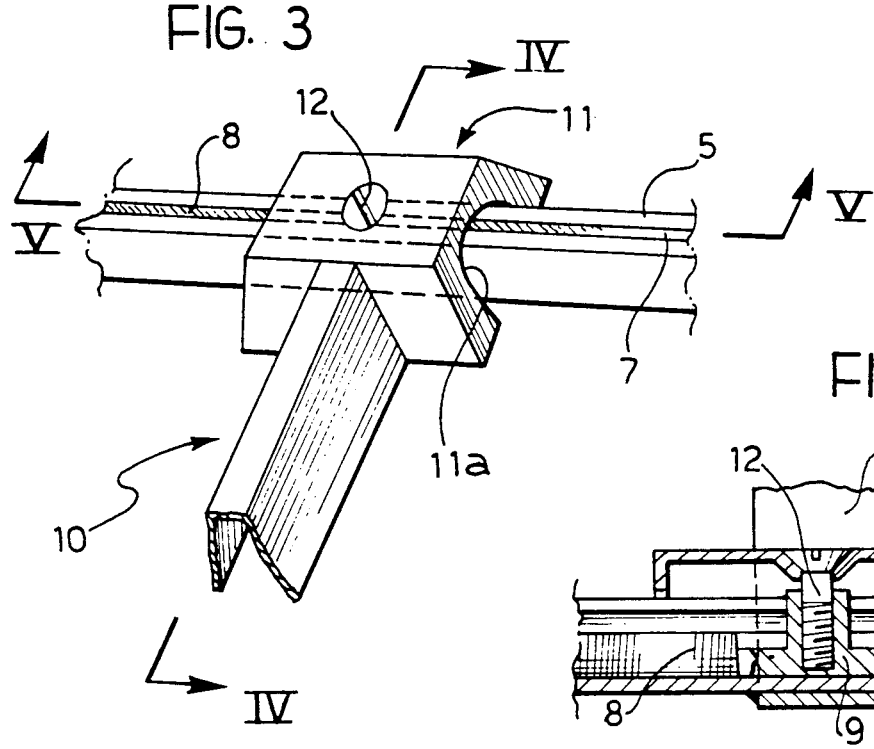
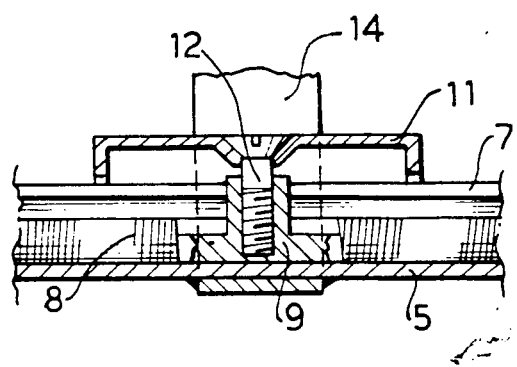

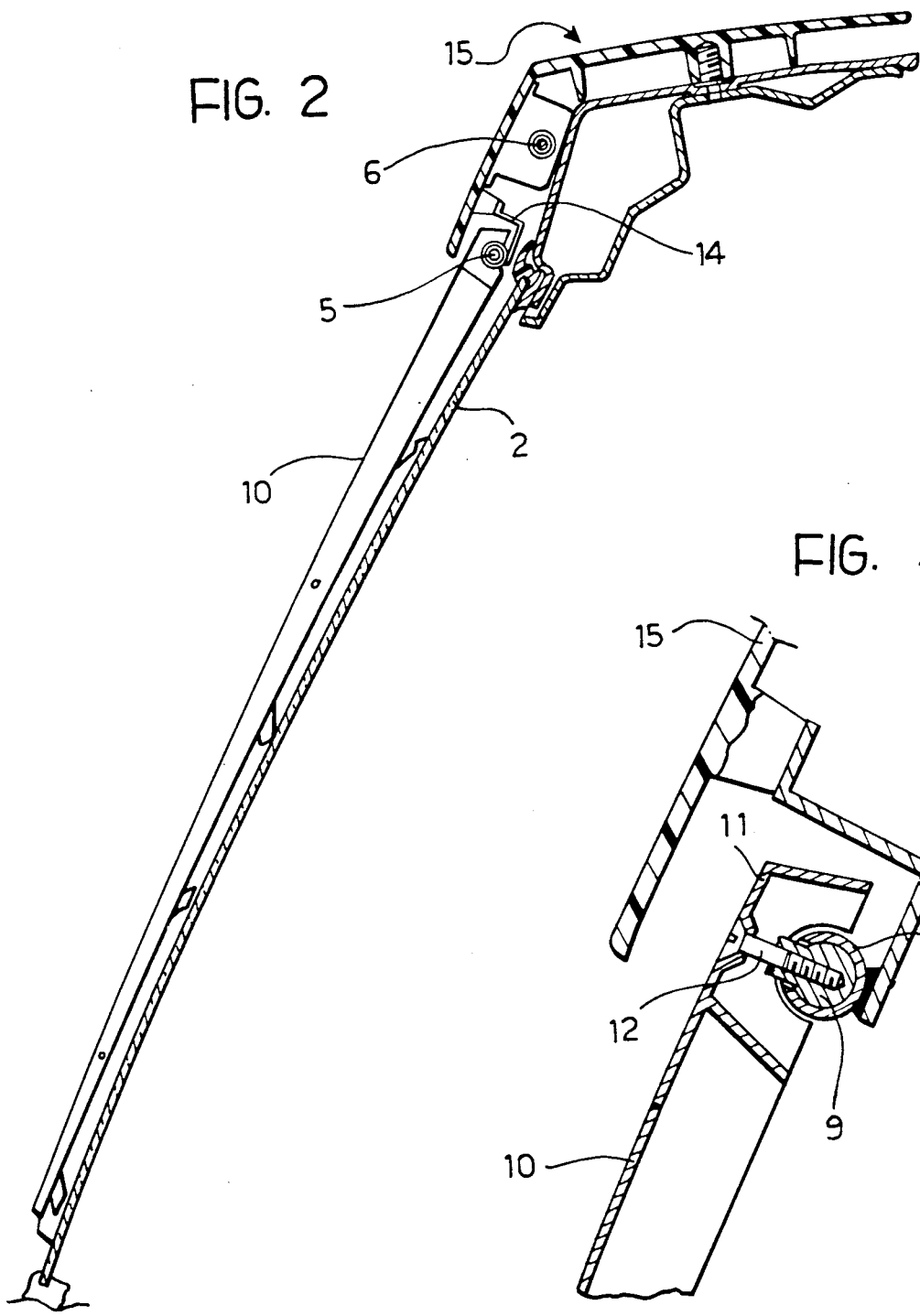

WINDSCREEN WIPER WITH TRANSLATIONAL MOTION, PARTICULARLY FOR A SPOILER ABOVE THE REAR WINDOW OF A MOTOR CAR

SUMMARY OF THE INVENTION

The present invention relates to a windscreen wiper with translational motion, particularly for the rear window of a motor car.

The object of the present invention is to provide a simple and functional windscreen wiper which can wipe almost the whole surface of the window and can be fitted to the vehicle particularly quickly and easily.

According to the present invention, this object is achieved by the production of a windscreen wiper which includes:

a hollow elongate guide element provided with a longitudinal channel having a lower horizontal limb and an upper horizontal limb which are interconnected at one end and arranged above the rear window, parallel to its upper side, a wiper arm mounted for sliding on the lower limb of the guide element, operating means slidable within the guide element and provided with a pin for fixing to the wiper arm, and motor means for imparting a reciprocal translational motion to the operating means within the guide element.

In the preferred embodiment, the guide element is connected by support flanges to the lower part of a spoiler situated on the rear edge of the motor car.

In order to rationalise the procedure for fitting the windscreen wiper, the guide element, the wiper arm and the motor means are mounted on the spoiler before the latter is finally mounted on the motor car.

BRIEF DESCRIPTION OF THE DRAWINGS

Further characteristics and advantages of the present invention will become clear from the detailed description which follows with reference to the appended drawings, provided by way of non-limiting example, in which:

FIG. 1 is a schematic perspective view of a motor car provided with a windscreen wiper according to the present invention, FIG. 2 is a section taken on the line II—II of FIG. 1, FIG. 3 is a perspective view of the detail indicated by the arrow III in FIG. 1, on an enlarged scale, FIGS. 4 and 5 are sections taken on the lines IV—IV and V—V of FIG. 3.

DETAILED DESCRIPTION OF THE DRAWINGS

In FIG. 1, a windscreen wiper with translational motion for the rear window 2 of a motor car 3 is generally indicated 1. The windscreen wiper 1 includes an elongate guide element 4 which is hollow inside. The guide element 4 includes a lower limb 5 arranged parallel to the upper edge of the window 2 and an upper limb 6. The two limbs 5 and 6 are interconnected at the end which is on the left in FIG. 1. The guide element 4 is provided with a longitudinal through-channel 7 in its upper part.

Operating means, for example, a cable of the type known as a Bowden cable 8, are situated within the guide element 4 and can slide relative to the guide element 4. The cable 8 is provided with a fixing device constituted by an entrainment member 9 which is inserted into the longitudinal channel 7 of the element 4 and projects from its upper part.

A wiper arm 10 is mounted for sliding on the lower limb 5 of the guide element 4. The upper end of the wiper arm 10 has an enlarged support portion 11 with a bearing surface 11a on its underside which is slidable on the outer surface of the lower limb 5 of the guide element 4. The upper portion 11 of the wiper arm 10 is fixed to the entrainment pin 9 by means of a screw 12.

An electric motor 13 of conventional type is fixed to the upper limb 6 of the guide element 4 and is associated with the operating cable 8. The motor 13 imparts a reciprocal translational motion to the cable 8 and, during this motion, the cable 8 draws the wiper arm 10 between the two extreme positions illustrated in FIG. 1 in continuous outline and in broken outline, respectively. The lower limb 5 of the guide element 4 is slightly curved so that, during its movement, the wiper arm 10 covers almost the whole of the surface of the window 2.

As shown in FIGS. 2 and 4, the two limbs 5 and 6 of the guide element 4 are fixed by means of support flanges 14 to the lower side of a spoiler 15. A characteristic of the present invention consists of the fact that the windscreen wiper 1 is mounted on the spoiler 15 before the latter is fitted to the rear edge of the motor car. This characteristic enables the procedure for the fitting of the windscreen wiper 1 to be rationalised and the assembly costs to be reduced. The fitting of the spoiler 15 to the motor car is not described in detail, since it is carried out in conventional manner. The use of the spoiler 15 for supporting the guide element 4 also has the effect of hiding the guide element 4 from view, thus also achieving an excellent result from the aesthetic point of view.

I claim:

1. A windscreen wiper assembly with translational motion for a motor car having a rear window with an upper horizontal edge, the motor car having a rear edge above the upper horizontal edge of the rear widow and proximate a roofline, said assembly comprising:

a spoiler mounted substantially in parallel to the upper horizontal edge of the rear window and externally to the motor car proximate to the edge of the roofline, said spoiler having a lower part and an inner surface;

a hollow elongate guide element provided with a longitudinal channel and having a lower horizontal limb and an upper horizontal limb arranged above the rear window, parallel to the upper side thereof, the lower limb and the upper limb being coupled together at one end thereof;

support flanges provided on the inner surface of the spoiler and adapted to connect the guide element to the lower part of the spoiler;

a wiper arm slidably mounted on the lower limb of the guide element;

operating means slidable within the guide element and provided with fixing means for fixing the wiper arm to the operating means; and motor means mounted within the spoiler for imparting a reciprocal translational motion to the operating means within the guide element wherein the windscreen wiper assembly is adapted to be retrofitted to the motor car.

2. A windscreen wiper according to claim 1, wherein the operating means slidable within the guide element is a Bowden-type cable.

3. A windscreen wiper according to claim 2, wherein the fixing means for the arm is constituted by an entrainment element which projects from the longitudinal channel.

4. A windscreen wiper assembly with translational motion adapted to wipe the rear window of a motor car having a roofline and a horizontal rear window frame comprising:

- a hollow elongate guide element provided with a longitudinal channel and having a lower horizontal limb and an upper horizontal limb, the lower limb and the upper limb being coupled together at one end thereof;
- a wiper arm slidably mounted on the lower limb of the guide element;
- operating means slidable within the guide element having fixing means secured thereto for mounting the wiper arm to the operating means;
- a spoiler having an inner surface and including a flange provided on the inner surface of the spoiler for connecting the guide element to the inner surface of the spoiler substantially in parallel with the spoiler, the spoiler being mounted externally to the motor car above and substantially in parallel with an upper horizontal edge of the rear window frame and proximate an edge of the roofline of the car; and
- motor means coupled to the operating means and mounted within the spoiler for imparting a reciprocal translational motion to the operating means within the guide element wherein the windscreen wiper assembly is adapted to be retrofitted to the motor car.

5. A windscreen wiper assembly according to claim 4, wherein the operating means slidable within the guide element is a Bowden-type cable.

6. A windscreen wiper assembly according to claim 5, wherein the fixing means for the arm has an entrainment element which projects from the longitudinal channel.

* * * * *